United States Patent [19]

Zsifkovits

[11] Patent Number: 4,861,365
[45] Date of Patent: Aug. 29, 1989

[54] SUPPORTING MECHANISM FOR THREE MOULDS IN A GLASSWARE FORMING MACHINE

[75] Inventor: Johann Zsifkovits, Forch, Switzerland

[73] Assignee: Emhart Industries, Inc., Farmington, Conn.

[21] Appl. No.: 280,768

[22] Filed: Dec. 6, 1988

[30] Foreign Application Priority Data

Dec. 29, 1987 [GB] United Kingdom ............... 8730249

[51] Int. Cl.$^4$ ............................................. C03B 9/353
[52] U.S. Cl. ........................................ 65/323; 65/361
[58] Field of Search ............... 65/323, 357, 359–361; 425/450.1, 451, 453

[56] References Cited

U.S. PATENT DOCUMENTS 3,472,639 10/1969 Mumford .......................... 65/359
3,607,207 2/1969 Dahms ............................. 65/359
4,486,215 12/1984 Irwin et al. ...................... 65/360

*Primary Examiner*—Joye Woodard
*Attorney, Agent, or Firm*—Spencer T. Smith

[57] ABSTRACT

Mould side portions (10; 110; 210) of three moulds are supported by a mechanism arranged to equalize mould closure force between the three moulds. Three mould side portions are supported by a triple support (50, 52; 150, 152; 250; 350) centrally pivotally mounted. The opposed mould side portions are mounted two on a double support (32; 232; 332) which is pivoted on a pivot (24; 224; 324) aligned with a line passing centrally between the center mould and one of the other moulds and one on a single support (40, 42; 240; 340) which is pivoted on a pivot (26; 226; 326) aligned with the center-line of the other of said other moulds.

3 Claims, 4 Drawing Sheets

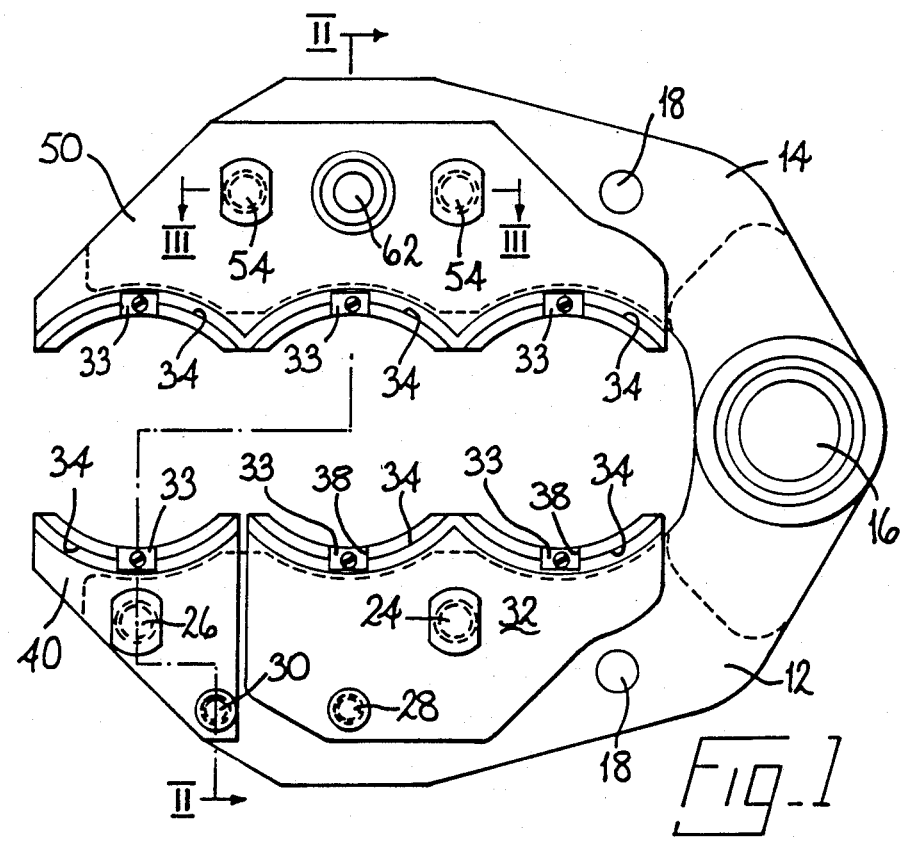
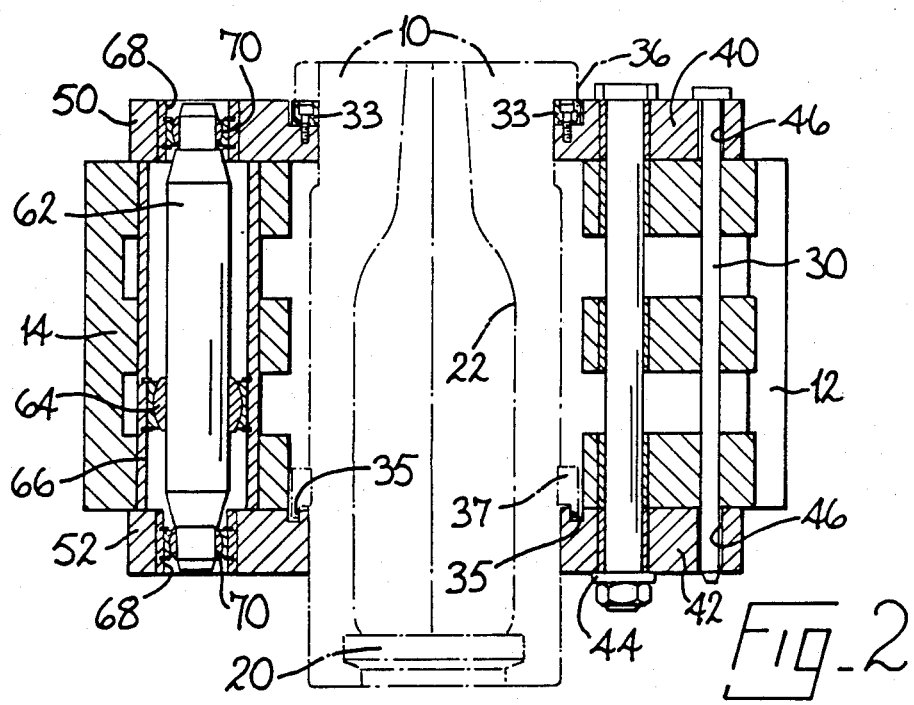

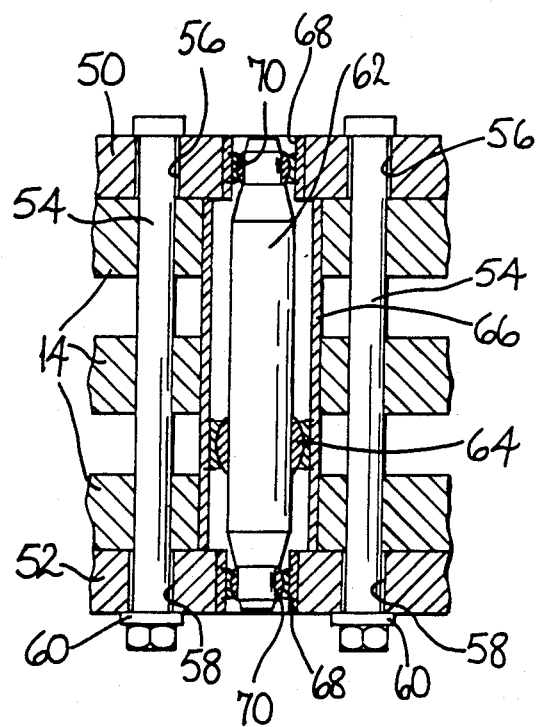
Fig_3
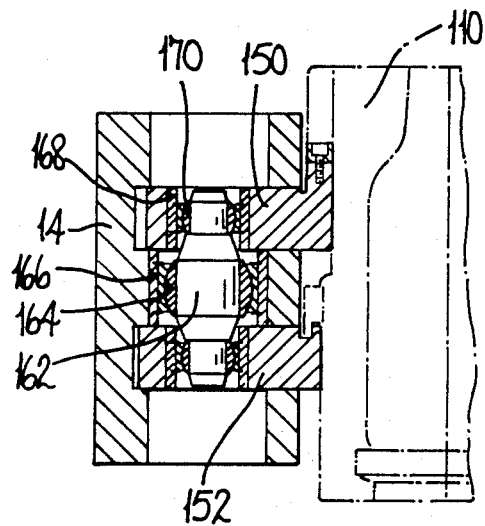
Fig_4

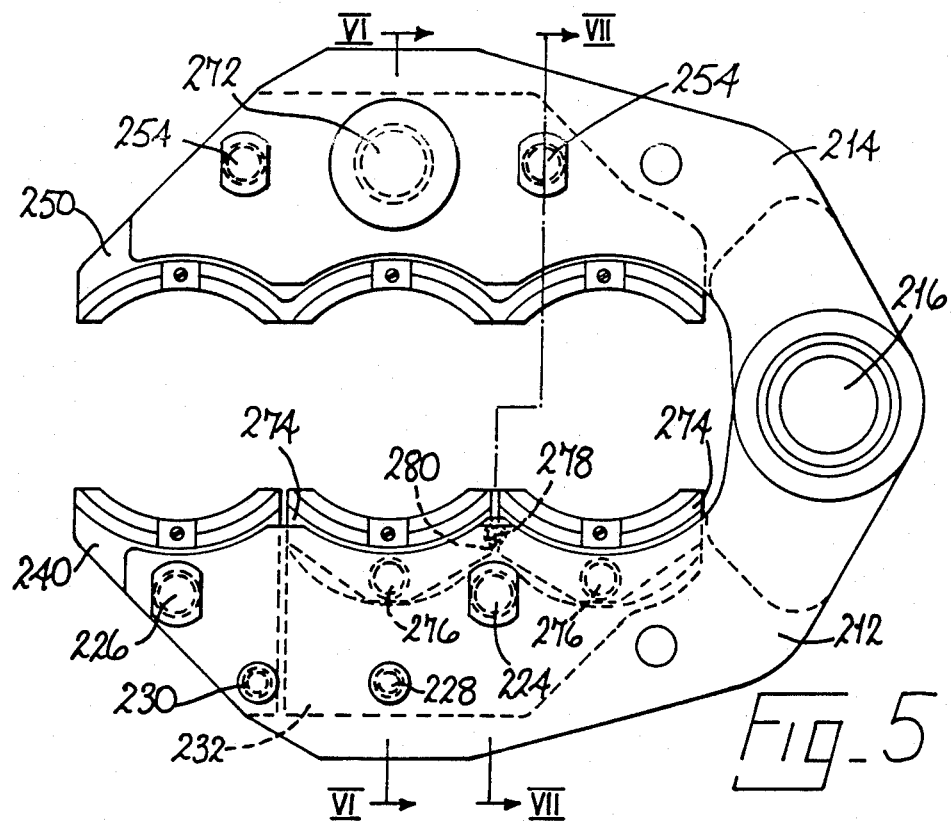
Fig_5
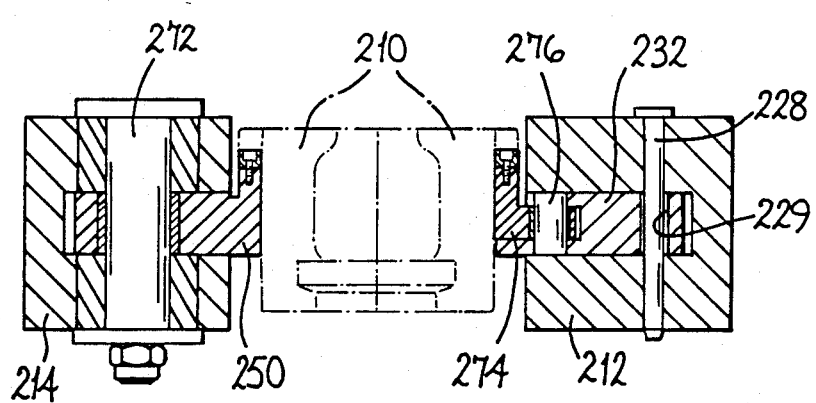
Fig_6

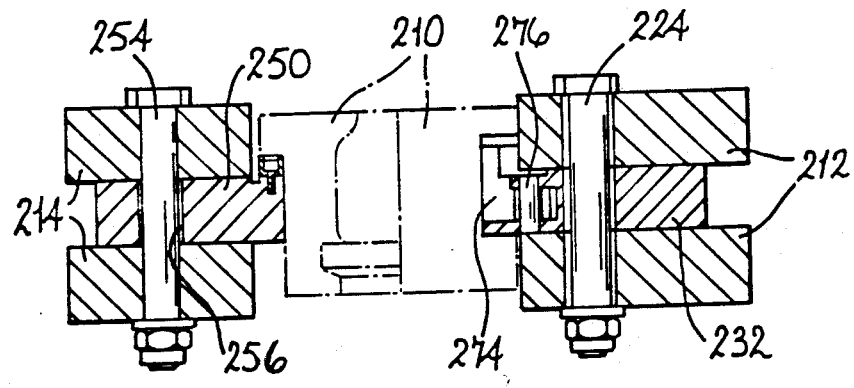
Fig_7
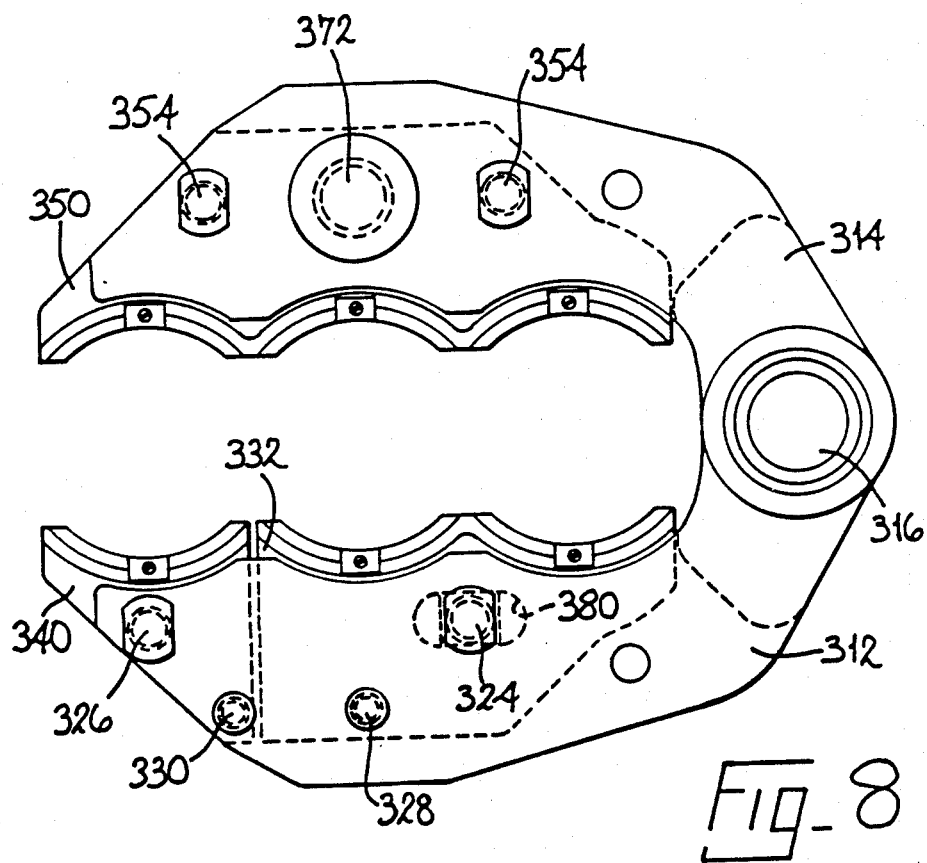
Fig_8

SUPPORTING MECHANISM FOR THREE MOULDS IN A GLASSWARE FORMING MACHINE

BACKGROUND OF THE INVENTION

This invention is concerned with a supporting mechanism for supporting mould side portions of three moulds in a glassware forming machine, e.g. of the individual section type.

In glassware forming machines of the individual section type, the supporting mechanisms for the mould side portions comprise two arms each arranged, on the application of a mould closure force thereto, to move in predetermined directions from mould open positions thereof to mould closed positions thereof and to remain in the mould closed positions during a moulding operation of the machine. In some machines of the individual section type, the arms move towards one another arcuately about a common vertical axis to reach their mould closed positions whereas in other machines the arms move linearly towards one another. In the mould closed position, one or more mould side portions (there may be as many as four) supported on each arm cooperate with mould side portions supported on the other arm to define mould cavities in which molten glass can be moulded. On the application of a mould opening force, the arms return to their mould open positions, by moving in the opposite direction to said predetermined direction. In their mould open positions, the mould side portions supported on each arm are separated from those supported on the other arm to allow removal of moulded glass. Such supporting mechanisms are used both for "blank" moulds for moulding gobs of molten glass into parisons, by a pressing or a blowing operation, and also for "finish" moulds for moulding parisons into completed articles of glassware.

Conventionally, the supporting mechanisms comprise an upper and a lower support mounted on each arm. The upper and lower support on an arm cooperate in supporting said one or more mould side portions. The supports are generally mounted on the arm for limited pivoting movements and each defines a recess into which a hook-shaped projection of the mould side portion extends so that the mould side portion hangs on the supports. Normally, a mould side portion rests on the upper support while the lower support prevents the mould side portion from pivoting relative to the upper support. However, with small moulds, there is only one support on each arm on which the mould portion hangs.

In conventional supporting mechanisms where there are three moulds, problems arise due to poor distribution of the mould closure force between the moulds so that one mould may receive excessive or insufficient force. This can result in the formation of pronounced seams on the parison or bottle. Various arrangements for distributing the mould closure force between three moulds are known but have not proved satisfactory. U.S. Pat. No. 3607207 describes a system in which each arm has a double and a single mould side portion support pivotally mounted thereon, the double support on one arm facing half the double support and the single support on the other arm. This system does not achieve equal force distribution. often leaving the centre mould with insufficient force. G.B Patent Specification No. 2132187 describes a system in which one arm has a triple support pivoted thereon while the other arm has two supports which each support one mould portion and cooperate in supporting a mould portion of the centre mould. This system is also not satisfactory as far as the centre mould is concerned. European Patent No. 0059573 describes a system of force balancing levers but is only applicable to linearly-moving moulds.

It is an object of the present invention to provide a simple supporting mechanism for three moulds in which the mould closure force is balanced substantially equally between the three moulds.

SUMMARY OF THE INVENTION

The invention provides a supporting mechanism for supporting mould side portions of three moulds in a glassware forming machine, the mechanism comprising two opposed arms each arranged, on the application of a mould closure force thereto, to move from a mould open position thereof to a mould closed position thereof and to remain in the mould closed position during a moulding operation of the machine, and, on the application of a mould opening force thereto, to return to the mould open position thereof, each of the arms being arranged to support three mould side portions which, when the arms are in their mould closed positions, each engages a mould side portion supported by the other arm to cooperate therewith in defining a mould cavity and which, when the arms are in their mould open positions, is separated from said mould side portion to allow removal of moulded glass, the mechanism also comprising supports pivotally mounted on the said arms and arranged to support three mould side portions, characterised in that the supports comprise a triple support pivotally mounted on one arm and arranged to support three mould side portions, a double support pivotally mounted on the other arm and arranged to support two mould side portions and a single support pivotally mounted on said other arm and arranged to support one mould side portion, and the arrangement being such that when the arms are in their mould closed positions the pivot of the triple support is aligned with the centre line of the centre one of the three moulds, the pivot of the double support is aligned with a line passing equidistantly between the centre mould and one of the other moulds and the pivot of the single support is aligned with the centre line of the other of said other moulds, the alignments being perpendicular to the parting line of the mould side portions.

In a supporting mechanism according to the last preceding paragraph, the mould closure force is found to balance substantially equally between the three moulds.

The force balancing across an individual mould may be improved if said double support supports two further single supports each of which is arranged to support one of the mould side portions supported by the double support and each of which is pivotally mounted on the double support, when the arms are in their mould closed positions, the pivots of said single supports being aligned with the centre-lines of their respective associated moulds.

The force balancing may be improved if said double support is arranged to slide to a limited extent relative to its pivot in a direction normal to said line passing halfway between the centre mould and one of the other moulds.

Where the mould portions are supported on an upper and a lower plate, the force may be balanced heightwise if each of said triple, double and single supports comprises an upper support plate and a lower support plate arranged to cooperate in supporting mould side portions, the upper and lower support plates mounted on at least one of the arms being mounted for limited movement in a horizontal plane, and the mechanism also comprises at least one force apportioning member arranged, when the arms are in their mould closed positions, to apportion the mould closure force between the upper and lower support plates, the force apportioning member being mounted on the arm to pivot about a horizontal axis between the upper and lower support plates and extending normal to the predetermined direction of movement of the arm, the force apportioning member also being pivotally connected to said upper and lower support plates.

BRIEF DESCRIPTION OF THE DRAWINGS

There now follows a detailed description, to be read with reference to the accompanying drawings, of four supporting mechanisms which are illustrative of the invention. It is to be understood that the illustrative mechanisms have been selected for description by way of example and not of limitation.

In the drawings:

FIG. 1 is a plan view of the first illustrative supporting mechanism;

FIG. 2 is a cross-sectional view taken on the line II—II in FIG. 1;

FIG. 3 is a cross-sectional view taken on the line III—III in FIG. 1;

FIG. 4 is a cross-sectional view similar to the left hand side of FIG. 2 but taken through the second illustrative supporting mechanism;

FIG. 5 is a plan view of the third illustrative supporting mechanism;

FIG. 6 is a cross-sectional view taken on the line VI—VI in FIG. 5;

FIG. 7 is a cross-sectional view taken on the line VII—VII in FIG. 5; and

FIG. 8 is a plan view of the fourth illustrative supporting mechanism.

DETAILED DESCRIPTION

The first illustrative supporting mechanism shown in FIGS. 1 to 3 is for supporting finish mould side portions 10 (which have been omitted from FIG. 1) of three moulds in a glassware forming machine of the individual section type. A modification of the first illustrative mechanism can support three blank moulds instead of three finish moulds. The mechanism comprises two opposed arms 12 and 14 which are mounted, in conventional manner, on a common vertical pivot pin 16. A mould opening and closing mechanism (not shown) of conventional construction is provided for applying a mould closure force or a mould opening force to the arms 12 and 14, the forces being applied via links (not shown) pivotally connected to the arms 12 and 14 by pins 18 mounted on the arms. In modifications of the illustrative mechanism, however, the moulds may move linearly according to the so-called AIS principle.

On the application of a mould closure force thereto, the arms 12 and 14 are each arranged to move arcuately about the pin 16 from a mould open position thereof (not shown) to a mould closed position thereof (shown in FIG. 1). The arms 12 and 14 approach one another with the arm 12 moving clockwise and the arm 14 moving anti-clockwise. The arms 12 and 14 are arranged to remain in their mould closed positions during a moulding operation of the machine, being held there by continued application of the mould closure force.

On the application of a mould opening force thereto, the arms 12 and 14 are each arranged to return to their mould open position by reversing their arcuate movements about the pin 16.

In the mould closed positions of the arms 12 and 14, the three mould side portions 10 supported by each arm engage the three mould side portions supported by the other arm and with bottom plates 20 and cooperate therewith to define three mould cavities 22 in which molten glass can be moulded. In the mould open positions of the arms 12 and 14 (not shown), the mould side portions 10 supported by the arm 12 are separated from those supported by the arm 14 to allow removal of moulded glass.

The arms 12 and 14 are both formed as three horizontally-extending plates interconnected by vertical bracing members (see FIG. 2).

The arm 12 supports two vertically-extending pivot pins 24 and 26 and two pivot limiting pins 28 and 30. Pivotally mounted on the pin 24 on top of the ar 12 is an upper double support plate 32 which cooperates with a lower double support plate (not shown) also pivotally mounted on the pin 24 but mounted beneath the arm 12, being supported by a washer (not shown) mounted on the pin 24. The two double support plates together form a double support arranged to cooperate in supporting two mould side portions 10 and, to this end, the upper double support plate has two arcuate slots 34 in an upper surface thereof into which depending portions of hook-shaped projections 36 of the mould side portions 10 extend to mount the portions 10 on the support. The upper slots 34 each have a gap 38 therein in which a location block 33 is mounted over which a slot in the projection 36 of the mould side portion 10 fits to prevent the hook-shaped portions 36 from moving along the slots 34. The lower double support plate (not shown) has two short straight slots 35 into which lower hook-shaped projections 37 of the side portions 10 fit to prevent the side portions 10 from tilting (the slots 35 of the double support are not visible in the drawings but are similar to those shown in FIG. 2). The pivot limiting pin 28 projects into clearance holes (not shown) in both the double support plates to limit the pivoting thereof about the pin 24 which is aligned with a line perpendicular to the parting line of the mould portions 10 and passing centrally between the two mould side portions 10 which are portions of a centre mould and one of the other moulds (that nearest to the pin 16). The double support can pivot about the pin 24 to equalise the mould closure force between the two mould side portions 10 supported thereby.

Pivotally mounted on the pin 26 are an upper single support plate 40 on top of the arm 12 and a lower single support plate 42 beneath the arm 12 and supported by a washer 44 on the pin 26. The single support plates 40 and 42 together form a single support arranged to cooperate in supporting a mould side portion 10 and, to this end, the upper plate 40 is provided with an arcuate slot 34 into which a depending portion of the hook-shaped projection 36 of the mould side portion 10 extends. A location block 33 is also provided. The lower plate is provided with a slot 35 to receive a lower hook portion 37 of the mould side portion 10. The pivot limiting pin 30 projects into clearance holes 46 in both the single support plates 40 and 42 to limit the pivoting thereof about the pin 26 which is aligned with a line perpendicular to the parting line of the mould portions 10 and passing centrally through the mould side portion 10 supported by the supports 40 and 42. The single support 40 and 42 can pivot about the pin 26 to equalise the mould closure force across the mould side portion 10 supported thereby.

The first illustrative mechanism also comprises an upper triple support plate 50 and a lower triple support plate 52 which are mounted on the arm 14 to cooperate in supporting three mould side portions 10 two of which cooperate with the mould side portions 10 on the double support 32 and one of which cooperates with the mould side portion 10 on the single support 40 and 42 in defining mould cavities 22. The upper support plate 50 is mounted on top of the arm 14 for limited movement in a horizontal plane, the movement being limited by two vertically-extending pins 54 supported by the arm 14 which pass through clearance holes 56 in the support 50 and have heads which retain the support 50 on the arm 14. The upper support plate 50 has three slots 34 and location blocks 33.

The lower triple support plate 52 is mounted beneath the arm 14 for limited movement in a horizontal plane, the movement being limited by the pins 54 which pass through clearance holes 58 in the support 52 and have washers 60 thereon which retain the support 52 on the arm 14. The lower support plate 52 is provided with three slots 35.

The first illustrative mechanism also comprises a member 62 which provides a pivot for the triple holder 50 and 52 and also provides a force apportioning member arranged, when the arm 14 is in its mould closed position, to apportion the mould closure force between said upper support plate 50 and said lower support plate 52. The member 62 is in the form of a cylindrical rod with turned-down ends. The member 62 is mounted on the arm 14 to pivot about a horizontal axis between the upper support 50 and the lower support 52, the axis extending normal to the predetermined direction in which the arm 14 moves to its mould closed position. Specifically, the member 62 is mounted on a spherical bearing 64 supported within a vertically-extending tube 66 set into the arm 14. The member 62 is also pivotally connected to the upper support plate 50 and to the lower support plate 52. Vertically-extending tubes 68 are set into the plates 50 and 52 and support spherical bearings 70 which engage the turned-down ends of the apportioning member 62. The plates 50 and 52 can pivot about the bearings 70 to an extent limited by the clearance holes 56.

Thus, the first illustrative supporting mechanism comprises a triple support 50 and 52 pivotally mounted on one of said arms 12 and 14 and arranged to support three mould side portions 10, a double support 32 pivotally mounted on the other of said arms and arranged to support two mould side portions 10, and a single support 40 and 42 pivotally mounted on the arm on which the double support 32 is mounted and arranged to support one mould side portion. When the arms 12 and 14 are in their mould closed positions, the pivot of the triple support 50 and 52, provided by the member 62, is aligned perpendicularly to the parting line of the mould portions with the centre-line of the centre one of the three moulds, the pivot of the double support, provided by the pin 24, is aligned with a line passing centrally between the centre mould and one of the other moulds, and the pivot of the single support 40 and 42, provided by the pin 26, is aligned with the centre-line of the other of said other moulds.

During a moulding operation, the apportioning member 62 pivots to apportion the mould closure force between the upper and the lower support plates 50 and 52. In this case, the lower support plate 52 requires more force than the upper support plate 50 so the horizontal axis is provided nearer to the lower support plate 52 than to the upper support plate 50. The exact height of the axis is predetermined and the height of the spherical bearing 64 in the tube 66 is adjusted accordingly. As the member 62 pivots, the plates 50 and 52 "float" in the aforementioned horizontal planes.

In the first illustrative supporting mechanism, the height of each support plate 50 and 52 remains constant, being defined by the height of the arm 14.

The spherical bearing 64 of the first illustrative supporting mechanism is approximately twice as far from the support 50 as it is from the plate 52. Because the mould cavity 22 illustrated in FIG. 2 has a greater surface area in the vicinity of the lower plate 52, that in the vicinity of the upper plate 50, the plate 52 is expected to experience the greater force, in this case, approximately double that experienced by the plate 50.

The height selected for the spherical bearing 64 depends not only on the size and shape of the mould cavity 22 but also on the heights of the plates 50 and 52, it being conventional to mount supports not only on top of or beneath arms but also in the gaps between the aforementioned horizontal plates of the arm. The optimum height can be determined by calculation or experiment.

The second illustrative supporting mechanism shown in FIG. 4 is identical to the first illustrative mechanism except that the arms 12 and 14 have the upper support plates 150 and lower support plates 152 mounted between the horizontal plates of the arm. The plates 150 and 152 cooperate in supporting mould side portions 110. The plates 150 and 152 shown in FIG. 4 are triple support plates are generally similar to the supports 50 and 52 and can float in a horizontal plane and cooperate with double and single plates similar to 32, 40 and 42. The plates 150 and 152 have tubes 168 set into them which support spherical bearings 170 engaged by turned down ends of a force apportioning member 162. The force apportioning member 162 is considerably shorter than the member 62 and is mounted on a spherical bearing 164 supported by a vertically-extended tube 166 set into the central horizontal plate of the arm 14. The horizontal axis on which the apportioning member 162 pivots is mid-way between the supports 150 and 152 so that the mould closure force is apportioned equally between the supports.

The third illustrative supporting mechanism shown in FIGS. 5 to 7 is similar to the first illustrative mechanism except as hereinafter described. The mechanism comprises two opposed arms 212 and 214 mounted on a common pivot pin 216 for similar movement to the arms 12 and 14. The arms 214 and 216, however, consist of two plates instead of three and the triple, double and single supports consist of only one plate (250, 232 and 240 respectively) positioned between the two plates of the arms, so that the mould side portions 210 are each supported on only one plate.

The triple support plate 250 is pivotal on a pivot pin 272 mounted on the arm 214 which is aligned with a centre line of a centre one of the three moulds. As there is only one triple support plate 250, a force apportioning member such as 62 is not necessary. The pivoting of the plate 250 about the pin 272 is limited by pins 254 mounted on the arm 214 which are loose fits in clearance holes 256 in the plate 250.

The double support plate 232 is pivoted on a pivot pin 224 mounted on the arm 212 which is aligned with a line passing centrally between the centre mould and one of the other moulds (that nearest the pivot pin 216). The pivoting of the plate 232 is limited by a pin 228 mounted on the arm 212 which is a loose fit in a clearance hole 229 in the plate 232. However, the plate 232 does not directly support the mould side portions 210 but instead these are supported on two single support plates 274. Each plate 274 is arranged to support one of the mould side portions 210 supported by the double support 232. Each plate 274 is pivotally mounted on the double support 232 on a pin 276 and, when the arms 212 and 214 are in their mould closed positions, the pivots 276 of the single supports 274 are aligned with the centre-lines of their respective associated moulds. The pivoting of the single supports 274 is limited by a pin 278 mounted on the double support 232 and is a loose fit in two arcuate recesses 280, one of which is formed in each of the single supports 274.

The single support plate 240 is pivoted on a pivot pin 226 mounted on the arm 212 which is aligned with a centre line of one of the moulds (that furthest from the pivot pin 216). The pivoting of the plate 240 is limited by a pin 230 which is mounted on the arm 212 and is a loose fit in a clearance hole in the plate 240.

As the arms 212 and 214 move to their mould closed positions, the pivots 226 and 276 enable the mould side portions 10 on the support plates 240 and 274 to move horizontally to their exact mating positions while the pivot 224 equalises the force between the centre mould and one of the other moulds and the pivot 272 equalises the force between the two non-centre moulds.

The fourth illustrative supporting mechanism shown in FIG. 8 is similar to the third illustrative mechanism except in the construction of its double support plate 332. The mechanism comprises two opposed arms 312 and 314 pivotal on a pin 316, the arms consisting of two plates while the triple, double and single supports consist of one plate (350, 332 and 340 respectively).

The triple support plate 350 is pivotal on a pin 372 similar to the pin 272 to a limit defined by pins 354 similar to pins 254. The double support plate 332 is pivotal on a pin 324 mounted on the arm 312 to a limit set by a pin 328. However, the plate 332 does not have single support plates 274 mounted thereon but is itself arranged to support the mould side portions. In contrast to the plate 232, however, the plate 332 is formed with an elongated slot 380 through which the pivot pin 324 passes. The slot 380 extends in a direction towards the single support plate 340 and normally thereto is a close fit on the pin 324. The slot 380 enables the double support plate 332 to shift its pivot point towards or away from the single support plate 340. Thus, the double support is arranged to slide to a limited extent (limited by the pin 328) relative to its pivot 324 in a direction normal to the side passing halfway between the centre mould and one of the other moulds.

The single support plate 340 is pivoted on a pin 326 similar to the pin 226, the pivoting being limited by a pin 330 similar to the pin 230.

I claim:

1. A triple gob individual section glassware forming machine for carrying out glassware forming processes in which three molds are formed by clamping together opposing mold halves supported by a supporting device, said supporting device comprising
   first and second arm means,
   first pivot means for pivotally supporting said first and second arm means at inner ends thereof,
   single, double and triple mold support means,
   second pivot means for pivotally supporting said triple mold support means on said first arm means centrally of the formed three molds,
   third pivot means for pivotally supporting said double mold support means on said second arm means centrally of the inner two formed molds, and
   fourth pivot means for pivotally supporting said single mold support means on said second arm means centrally of the outermost formed mold.

2. A machine according to claim 1, wherein said single, double and triple mold support means each comprises top and bottom plate located above and below said first and second arm means.

3. A machine according to claim 1, further comprising means for limiting pivotal rotation of said single, double and triple mold support means.

* * * * *